Nov. 11, 1969   W. W. MAYNE   3,478,195
DEAD RECKONING INSTRUMENT
Filed Jan. 2, 1968   4 Sheets-Sheet 1

Nov. 11, 1969      W. W. MAYNE      3,478,195
DEAD RECKONING INSTRUMENT
Filed Jan. 2, 1968      4 Sheets-Sheet 3

United States Patent Office

3,478,195
Patented Nov. 11, 1969

3,478,195
DEAD RECKONING INSTRUMENT
Walter W. Mayne, 1241 N. East St.,
Anaheim, Calif. 92805
Filed Jan. 2, 1968, Ser. No. 695,264
Int. Cl. G06c 1/00; G06g 7/78; G06f 15/50
U.S. Cl. 235—61
21 Claims

ABSTRACT OF THE DISCLOSURE

A dead reckoning instrument which is rotatable about a center and has radially inner and outer spaced apart walls. The walls are arranged to define sine and cosine functions of a unitary maximum spacing between the walls on a pair of perpendicular radiants. A pair of feelers reciprocate in a radial direction on a pair of perpendicular radiants. They actuate respective registers for recording components of the unitary lengths in coordinate directions of a compass. Means are provided to actuate the cam followers periodically in response to a predetermined travel of a vehicle in which the instrument is installed.

BACKGROUND OF THE INVENTION

Field of the invention

This invention relates to dead reckoning instruments.

State of the prior art

Navigators and pilots of vehicles, particularly of ocean going vessels and of aircraft, must frequently ascertain their position. This can be done in a number of ways, as, for example, by reference to celestial objects, or with the help of radio transmitters. Another method for ascertaining the position for the vehicle is by measuring its travelled distance and determining the corresponding trigonometric distances in coordinate directions of the compass. This is the dead reckoning method of determining one's position.

Dead reckoning instruments employ a compass which is operatively connected with means for trigonometrically breaking the distances into components in the coordinate axis of the compass. The navigator plots the component distances on the coordinate axes of the map, with the point where he commenced his journey being the origin, to find his position. The task is simple, quickly performed, and can be repeated any number of times. Most importantly the navigator is completely independent of exterior objects.

In the past all devices for breaking the travel distances into component distances in the coordinate axis of the compass employed rotating friction discs and a friction wheel engaging the disc. The wheel is radially movable towards and away from the center of the disc.

A compass emits output signals in accordance with the vehicle's heading. The output signals are used to position the friction wheel on the face of the disc. The angular velocity of the wheel relative to the disc is thereby changed in accordance with the heading of the vehicle. A register monitors the wheel and indicates the component distance of the travelled distance in a coordinate direction. The friction wheel permits plus or minus registration such that the distance of the vehicle as well as the directionality of its total travelled distance from a starting or null point can be ascertained. Thus, the navigator knows whether the indicated distance from the null point is north or south of it.

The accuracy with which the component distances are registered is determinative of the accuracy with which the navigator can ascertain its position. Even the most carefully constructed instruments exhibit slippage between the friction disc and wheel. This slippage cannot be compensated for in advance and inaccuracies are therefore unavoidable. The friction wheel is usually constructed of a relatively soft and resilient material, such as soft rubber, to minimize slippage. As a result thereof, however, wear reduces the diameter of the friction wheel, thereby changing the ratio with which the friction disc drives it. This introduces undetectable errors.

Inaccuracies of prior art instruments are cumulative and errors increase with increased travel of the vessel. It is therefore necessary, although not always possible as, for example, when a vessel is in the middle of an ocean, to periodically reset the instrument. Otherwise the error becomes so large as to be deceiving, thereby endangering the safety of the vessel. This defeats the purpose of the dead reckoning instrument which is intended to provide a navigational system independent of natural reference points.

The relatively large number of precision parts necessary to construct prior art dead reckoning instruments makes them expensive. In addition, they require a substantial amount of costly maintenance to keep them in proper operating condition.

SUMMARY OF THE INVENTION

Briefly, a dead reckoning instrument constructed in accordance with the present invention includes a pair of registers for recording travel of a vehicle in coordinate directions of the compass. Pivotally mounted reciprocable members are selectively engageable with drive wheels of the register and are connected with means for limiting the reciprocating movements of the members to positive and negative sine and cosine components of a unitary length in the coordinate directions. Means are provided for engaging the member and the drive wheel when the member reciprocates in one direction and for disengaging them when the member reciprocates in another, opposite direction. Drive means periodically reciprocate the member and are capable of moving it in opposing directions over a length equal to at least twice the unitary length.

In the preferred embodiment of this invention the limiting means include a directional cam which is rotatable about a center and which has a race way defined by a pair of inner and outer annular walls. The annular walls are spaced apart a distance corresponding to a sine and a cosine component of the unitary length, which is defined by a maximum distance between them, on a pair of perpendicular radiants. The engaging means include a feeler movable in a radial direction toward and away from the center between the annular walls. The feelers are periodically actuated by drive means in response to the distance travelled by the vehicle.

The directional cam is rotated in response to output signals received from a suitable compass. The feelers are thereby movable a distance corresponding to the positive or negative sine and the cosine component of the unitary length. Whether the component is positive or negative depends on the direction in which the vehicle travels. The movements of the feelers are recorded by the register. If the feelers are actuated at, say, each 1/50th of a mile travelled by the vehicle, each register records the component of the 1/50th of a mile which the vehicle travelled in a perpendicular pair of coordinate directions of the compass. After a period of time the navigator can ascertain his position by plotting the distances travelled in the coordinate directons as indicated on the registers on the coordinate lines of the map. The origin or null point of the plot is the location where both registers were set at zero. The null point chosen is a location identifiable on the map such as a port or a lighthouse.

During operation of the device there is no slippage between the directional cam and the feeler. The distances recorded by the registers are therefore free of the heretofore unavoidable inaccuracies in transmitting motion between the drive disc and the drive wheel. Even extended use of the instrument does not subject its measuring components to wear. Inaccuracies resulting from wear of the friction discs and the wheels of prior art instruments are thereby eliminated.

The dead reckoning instrument of this invention provides an instrument which is capable of indicating the vehicle's position without reference to external objects even after the vehicle has travelled long distances. It is therefore substantially more convenient to use. It also provides a navigator with means for ascertaining its position with the highest degree of accuracies under circumstances where navigational reference points, such as fixed objects, are not available to him. The instrument is therefore particularly well adapted for use in open seas or under fog conditions.

The relatively small number of parts required to construct the instrument and the relatively low cost with which the parts can be manufactured make it substantially less expensive than prior art instruments. It is therefore available to owners of small vehicles which, at the present, are unwilling and often unable to afford the expensive and relatively inaccurate prior art dead reckoning instruments.

DESCRIPTION OF THE PREFERRED EMBODIMENTS

Figure 1:
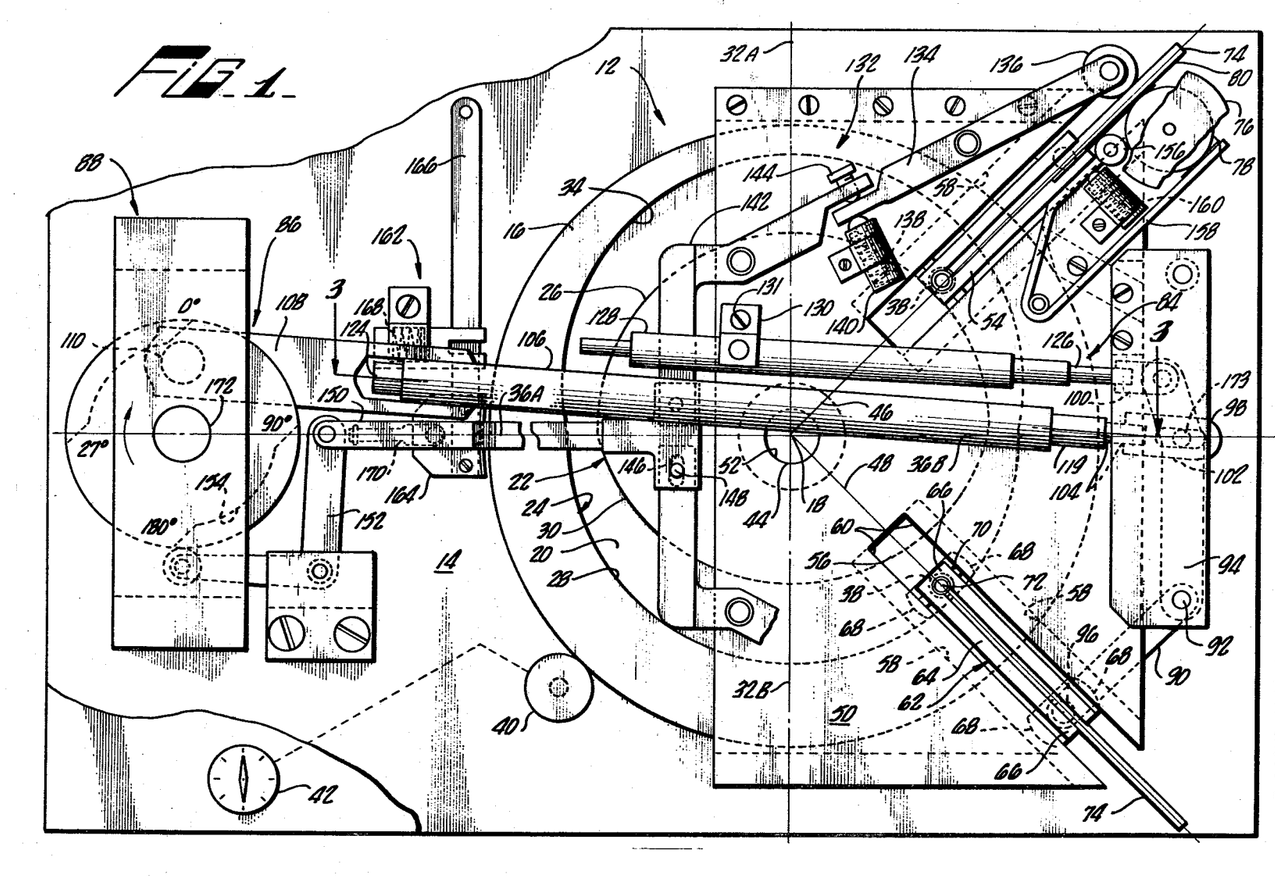
FIG. 1 is a plan view of a dead reckoning instrument constructed in accordance with the present invention.
Figure 2:
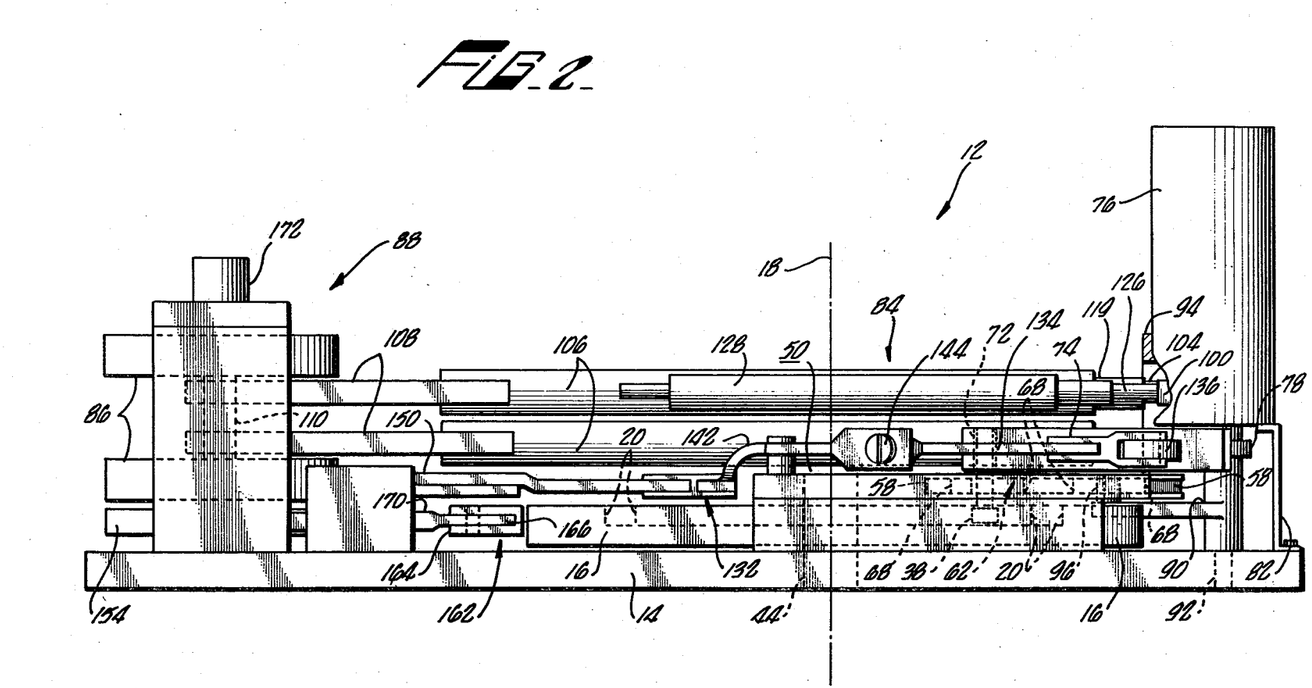
FIG. 2 is a front elevational view of the instrument shown in FIG. 1.

Referring to FIGS. 1 and 2, a dead reckoning instrument 12 constructed in accorance with the present invention includes a base 14 and a directional cam 16 rotatable about an axis 18 and mounted on the base. A race way 20 is defined by a radially inner wall 22 and a radially outer wall 24. A portion 26 of the inner wall extends over 180° and is defined by a cylindrical surface having as its center the axis of the directional cam. Diametrically opposite from portion 26 is a portion 28 of the outer wall 24 which also extends over 180° and which is defined by a cylindrical surface having a diameter which is greater than that of portion 26 by a predetermined amount, more fully set forth below, and which is concentric with the axis 18. A remaining portion 30 of the inner wall has a configuration such that a distance between it and the opposite portion 28 of the outer wall defines a negative sine-cosine function of a unitary length on unitary length radiants 32A and 32B. The unitary length equals the length on a unitary radiant between the inner and outer wall, less a predetermined amount, as more fully set forth below. Similarly, a remaining portion 34 of the outer wall has a configuration such that a radial distance between it and the opposite portion 26 of the inner wall defines a positive sine-cosine function of the unitary length which is similarly the greatest distance between the portions 26 and 34.

Spaced 90° in either direction from the unitary length radiants 32A and 32B are two zero radiants 36A and 36B. A radial distance between the inner and outer walls 22 and 24 on the zero radiants 36A and 36B equals the above referred to predetermined amount and an outer diameter of a cylindrical feeler 38 disposed in the race way 20. Means, such as a drive wheel 40, are operatively connected with a compass 42 and rotate the directional cam 16 about a shaft 44 mounted on the base 14 to maintain the cam stationary relative to the true northern direction. The compass emits output signals used to energize a motor (not shown) connected with the drive wheel 40. The drive wheel rotates the directional cam through an angle corresponding to the angle by which the vessel's heading deviates from the north direction. This angle indicates the direction of travel of the vehicle. As the vehicle changes its heading or direction the directional cam is rotated through a like angle.

A pair of perpendicular fixed radiants 46 and 48 are arranged such that when the vehicle travels in a true northern direction the radiant 48 is aligned with the unitary radiant 32A intermediate portions 26 and 34 of the inner and outer walls 22 and 24, respectively. Radiant 46 is simultaneously aligned with zero radiant 36A. On the other hand, if the vessel travels in a true western direction, the drive cam is rotated such that radiant 48 is aligned with zero radiant 36A and radiant 46 is aligned with the unitary radiant 32B intermediate portions 28 and 30 of the inner and outer walls 22 and 24 respectively. If the vessel leads in, say, a north-eastern direction, the directional cam is rotated until the fixed radiants are positioned at 45° relative to the unitary and zero radiants.

A guide plate 50 is secured to base 14 and is plane parallel thereto. The guide plate includes a cylindrical hole 52 to mount the shaft 44 and a pair of slots 54 and 56 which are aligned with and parallel to the pair of perpendicular radiants 46 and 48. The slots extend radially inwardly towards the axis 18 past the inner wall 22 of the race way 20 and include a pair of horizontal grooves 58 adjacent each side 60 of the slots. The grooves extend from a periphery of the guide plate towards the innermost end of the slots.

A carriage 62 includes an elongated body 64 and a pair of spaced-apart end plates 66 which include legs 68 extending into the grooves 58. Stop pins 70 fixedly mounted on the inner ends of plates 66 extend from the body to adjacent the sides 60 of the groove and prevent movements of the body and the end plates in a direction transverse to the adjacent fixed radiant 46 or 48. Each carriage is movable relative to the axis 18 parallel to one of the fixed radiants.

The feeler 38 is mounted on the inner end plate 66 and extends from the plate downwardly into the race way 20 of the directional cam 16. A pivot pin 72 is preferably aligned with the axis of the feeler and extends upwardly from the inner end plate 66. A clapper 74 journals pivot pin 72 and extends radially outward from the pivot pin. It has a length substantially greater than the length of carriage 62. Each carriage and the clapper are movable over a distance corresponding to the radial distance between the inner and the outer wall 22 and 24 in alignment with the fixed radiants 46 and 48.

A conventional register 76 includes a rotatable drive wheel 78 and is mounted adjacent each clapper 74. The periphery of the drive wheel is engaged by a friction surface 80 bonded to a portion of the clapper facing the drive wheel when the clapper is biased towards the wheel. A bracket 82 secures the register to the base 14.

The carriage 62 and the feeler 38 are actuated by a linkage 84 connecting the carriage with a drive cam 86 of a drive mechanism 88. The linkage includes an arm 90 pivotable about a vertical shaft 92 disposed between the base 14 and a mounting plate 94 positioned adjacent an end of the guide plate 50. An end of the arm is connected with a downwardly extending shaft 96 of the carriage 62. Another end of the arm is elevated relative to the end connected to the carriage and includes a pair of apertures (not shown) for engaging a first jaw 98 and a second jaw 100.

The first jaw includes an elongated slot 102 and is secured to a rod 104 protruding from a tubular housing 106. At its other end the housing is secured to a flat push rod 108. The end of the push rod remote from the housing pivotably engages a cam shaft 110 of the drive mechanism 88.

Figure 3:
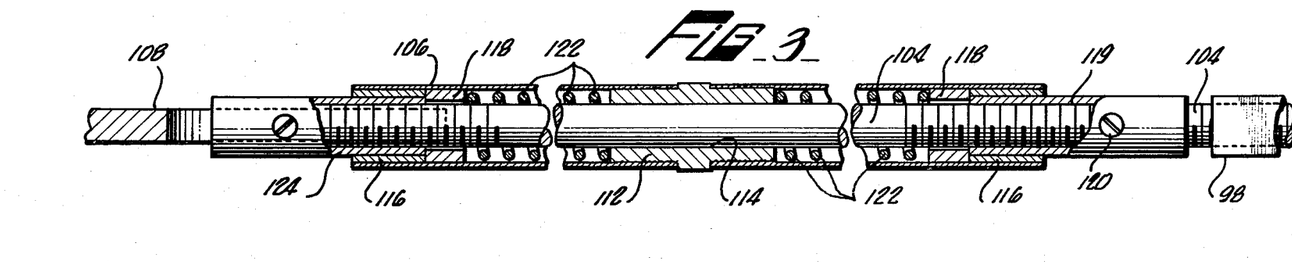
FIG. 3 is a fragmentary enlarged cross-sectional view taken along line 3—3 of FIG. 1.

Referring to FIG. 3, the rod 104 is disposed in the housing 106 and is movable relative to it. A plug 112 is secured to a center portion of the housing and has an axial hole slightly greater than the outer diameter of the rod. Adjacent each end the inner diameter of the housing is reduced by means of a sleeve 116 whereby an axially movable elongated collar 118 is prevented from moving past the adjacent end of the housing. A coupling 119 is threaded to the rod 104 and is axially movable relative to the rod by threading the two in one or the other direction. An end of the coupling projecting past the housing includes a set screw 120 which can be engaged with the threaded portion of the rod. The other end of the coupling engages the collar 118. By axially moving the coupling relative to the rod the distance between the plug 112 and the jaw 98 can be varied. A helical compression spring 122 is disposed between faces of the plug 112, the collar 118, and biases the collar, the coupling, and the rod 104 in a direction away from the face of the plug. The other end of the housing 106 includes a similar coupling 124 engaging another plug 118 and biased by a compression spring 122 in the opposite direction.

The compression springs are installed inside the housing and are prestressed a predetermined amount so that the collars 118 are continuously biased in a direction away from the plug and toward sleeves 116. After the springs have been so prestressed no relative movements between the housing 106 on the one hand, and the rod 104, the collars 118, and the couplings 119, on the other hand, are possible until a force greater than the force exerted by the prestressed springs is applied.

The second jaw 100 is secured to an elongated rod 126 which is similar to the rod 104 and is disposed within a tubular housing 128. The tubular housing includes a plug (not shown) as well as helical compression springs (not shown) which are arranged substantially identical to those in the tubular housing 106. For brevity they are not further described herein. The tubular housing 128 is pivotably secured to the guide plate 50 by a bracket 130 which is pivotable about a mounting pin 131.

The second jaw 100 is pivotally secured to the arm 90 and positions the arm, and with it the carriage 62 and the feeler 38, in an original position. The arm is fixed and immovable until it is subjected to a force sufficient to overcome the force of the prestressed springs in the housing 128. Axial movement of the first jaw 98, which is actuated by the drive cam 86 of the drive mechanism 88, pivots the arm 90 about shaft 92 and thereby moves the carriage and the feeler parallel to the radiant 48 towards and away from the axis 18. The force exerted by the first jaw must be greater than the force exerted by the springs in the housing 128. The springs 122 are therefore prestressed a greater amount than the springs in housing 128.

Relative movements between the housing and the rod first occur between housing 128 and rod 126, thereby assuring actuation of the arm 90 by rod 104.

The dead reckoning instrument 12 shown in FIG. 1 includes a pair of pivotable arms 90 and respective jaws and actuating mechanisms driven by the drive mechanisms driven by the drive mechanism 88. For clarity only one such arm and actuating mechanism is illustrated in FIG. 1 but both are shown in FIG. 2.

During operation of the instrument the carriages 62 reciprocate along the perpendicular radiants 46 and 48. During their movement in one direction the friction surfaces 80 are in engagement with the periphery of the drive wheel 78 while they are disengaged when they move in the opposite direction.

An engaging mechanism 132 includes a pivotally mounted bar 134 disposed on a side of the clapper 74 opposite from the friction surface 80. One end of the bar adjacent the drive wheel 78 of the register 76 includes a roller 136 which is biased into engagement with the clapper by a spring 138 adjacent the opposite end of the bar. The spring is preferably mounted in a housing 140 which is suitably secured to the guide plate 50.

A pivotable bell crank 142 has one end adjacent the end of the bar 134 in engagement with the spring 138 provided with a set screw 144. Another end of the bell crank includes an elongated slot 146 engaging a pin 148 of a push bar 150. The other end of the push bar is pivotably secured to another bell crank 152 which engages and is actuated by a cam 154 of the drive mechanism 88.

A roller 156 mounted adjacent an end of a generally U-shaped pivotable member 158 is biased towards the friction surface 80 of the clapper 74 by a spring 160 mounted on the guide plate 50 in a manner similar to spring 138. The clapper is thus biased away from the periphery of the drive wheel 78. The other end of the U-shaped member is longer than the one mounting the roller 156 and is arranged to engage the periphery of the drive wheel 78 when the roller 156 engages the friction surface of the clapper and biases it away from the drive wheel. The member 158 acts as a brake on the drive wheel of the register 76 whenever it is disengaged from the friction surface of the clapper. Inadvertent rotation of the drive wheel is thereby prevented. To increase the effectiveness of the brake the end of the U-shaped member adjacent to the drive wheel is preferably provided with a friction surface (not shown) similar to friction surface 80 of the clapper 74. The spring 160 is constructed to exert a force sufficient to pivot the clapper 74 out of engagement with the drive wheel 78. Its force, however, is less than the force with which spring 138 biases the clapper into engagement with the drive wheel. This assures engagement between the clapper and the drive wheel at all times except when cam 154 actuates the engaging mechanism 132 and pivots the bar 134 in opposition to the force exerted by spring 138.

To assure accurate readings it is desirable to prevent rotation of the directional cam while the clapper engages the periphery of the drive wheel 78 and the movement of the feeler 38 is recorded on the register 76. A brake 162 is therefore disposed adjacent the periphery of the directional cam and is preferably actuated by the bell crank 152 of the engaging mechanism 132. The brake includes a brake shoe 164 secured to a pivot bar 166 mounted on base 14 and is biased in a direction towards the periphery of the directional cam by a suitable coil spring 168. A pull bar 170 is pivotally secured to the bell crank 152 and the brake shoe 164. When the bell crank is positioned to disengage the pivot bar 134 from the clapper 74, the pull bar 170 biases the brake shoe away from the periphery of the directional cam. When the bell crank is positioned to engage the clapper 74 and the pivot bar 134, the pull bar 170 permits the spring 160 to pivot the brake shoe 164 into engagement with the periphery of the directional cam. Rotation of the directional cam while the clapper is in engagement with the drive wheel 78 of the register 76 is thereby prevented.

Turning to the operation of the dead reckoning instrument 12 and referring to FIGS. 1 and 2, the instrument is first installed in a vehicle, say a vessel (not shown). The drive wheel 40 is operatively connected with the compass 42 and the directional cam 16 is positioned to align radiant 48 with unitary radiant 32A and radiant 46 with zero radiant 36A, as was described above, when the compass needle is aligned in a true northern direction.

The second jaw 100 is adjusted by rotating the sleeves (not shown) disposed in housing 128 until the feelers 38 are closely adjacent, but not in contact with the cylindrical surfaces 26 and 28, respectively. The distance between the periphery of the feelers and the cylindrical surfaces is preferably no more than about .0005 to .001 inch. The directional cam is thereby free to rotate without interference from the feelers.

A shaft 172 of the drive mechanism 88 is connected with a suitable motor (not shown) which is periodically energized to rotate the shaft and the cams mounted thereon through one full revolution. The motor is operatively connected with a speedometer (not shown) measuring the vessel's absolute speed. Control means (not shown) are connected with both the speedometer and the motor and energize the motor every time the vessel travels a predetermined distance. In a preferred embodiment of this invention the control means actuate the motor to rotate the shaft 172 through 360° every time the vessel has travelled a distance of $\frac{1}{50}$th of a mile.

During a full revolution and starting at zero degrees, which is the position of cam shaft 110 shown in FIG. 1, the push bar first moves in a direction towards the axis 18 of the directional cam. This movement lasts for 90° of the cam shaft's rotation. The movement of the housing 106 and the rod 104 is transmitted to the arm 90 after an end of the slot 102 in the first jaw 98 engages a vertical pin 173 of the arm. Thereafter the arm pivots about shaft 92 in a clockwise direction, as seen in FIG. 1, and moves the carriage 62 and the feeler 38 towards the axis 18 of the directional cam. The cam shaft 110 is positioned such that it is capable of moving the feelers from adjacent the cylindrical outer wall 28 into contact with the opposing portion 30 of the inner annular wall 22 when the unitary radiant 32B is aligned with either fixed radiant 46 or fixed radiant 48. To assure that the feeler actually moves over that distance the cam shaft 110 provides for overtravel of the push rod 108. The extra travel is then absorbed by the springs 122 in housing 106. To pivot the arm 90 the jaw 100, together with rod 126, must be moved against the force exerted by the springs (not shown) disposed in the housing 128.

While rotating through the first 90°, the cam 154 permits the bell crank 152 to pivot clockwisely, as seen in FIG. 1, and the spring 138 pivots the bar 134 to engage the friction surface 80 of the clapper with the periphery of the drive wheel 78 of the register 76. Thus, the movement of the feeler 38 from adjacent wall 28 to adjacent and into contact with wall 30 is being recorded by the register.

At 90° the cam 154 pivots the bell crank 152 in a counterclockwise direction, thereby disengaging the bar 134 from the clapper and enabling spring 160 to pivot both the U-shaped member 158 and the clapper in a counterclockwise direction. This disengages the friction surface 80 from the periphery of drive wheel 78.

While the cam 86 rotates from 90° and 180° the cam shaft 110 returns the rod 104 and the housing 106 into their original position. The rod 126, actuated by the springs (not shown) disposed inside housing 128 returns to its original position thereby pivoting the arm 90 into the position it was in at the beginning of the rotation of the cam shaft 110. Return of the arm 90 into its original position returns the feeler 38 to adjacent the cylindrical portion 28 of the outer annular wall 24. This movement is not recorded by the register since the U-shaped member 158 keeps the clapper 74 disengaged from the drive wheel 78.

During the first 180° of rotation of cam shaft the other feeler 38 is disposed adjacent the inner cylindrical wall 26 of the inner annular wall 22. The other arm (not shown) imposes a force on the other feeler to move it in the same direction towards the axis 18 in which the first feeler moves. Since the second feeler cannot move in that direction the movement of the cam shaft is taken up within the linkage connecting it with the other feeler. More particularly, the left hand spring 122 (see FIG. 3) is compressed an amount equal to the lateral movement of the cam shaft. The movements of the clapper, the bar 134, and the U-shaped member 158 assigned to the feeler 38 on radiant 46 remain the same as the movements of those members assigned to the feeler on radiant 48. Since the feeler remains stationary nothing is recorded on that register 76.

While the cam shaft moves from 180° to 270° the linkages 84 of both feelers move in the opposite directions from the direction it moved when the cam rotated from zero to 90°. The sequence of movements remains identical except for the reversal of its direction. The feeler 38 on radiant 48 is now prevented from moving since it is positioned adjacent the cylindrical wall 28. The movement of the feeler on radiant 46, however, is in a direction away from the axis 18 and continues until it contacts the outer portion 34 of the outer annular wall 28. During this movement the friction surface is in engagement with the drive wheel 78 and the register records. During the return movement the clapper is disengaged from the drive wheel and no recording takes place.

The brake 162 engages the periphery of the directional cam 16 during the times when the clapper 74 is in engagement with the drive wheel 78, that is, while the cam shaft 110 rotates from zero degrees to 90° and from 180° to 270°.

If the vessel changes its heading such that the directional cam rotates a sufficient amount to locate the outer cylindrical surface 28 adjacent the feeler 38 on radiant 46 and inner cylindrical wall 26 adjacent the feeler on radiant 48, the movement of the carriage 62 and the feelers during which the registers 76 records is reversed. In this instance the recorded total shown on the registers increases, assuming it decreased previously. The purpose of this reversal is best described on hand of an example.

Assume that the north-south coordinate axis of the compass is represented by radiant 48 and the east-west axis by radiant 46. Further assume that the vessel travels in a south-eastern direction and that this direction corresponds to the positioning of the directional cam 16 shown in FIG. 1. Every $\frac{1}{50}$th of a mile the drive mechanism 88 is actuated and rotated through 360°. The two registers respectively record the distance the vessel travelled in the southern and the eastern direction, both being less than $\frac{1}{50}$th of a mile. The actual recording on the registers is the sine and the cosine component of the travel of $\frac{1}{50}$th of a mile. The components respectively indicate the distance the vessel travelled on the coordinate axes of the compass, is dependent on the heading or course of the vessel, and is directly measured by the feeler when it reciprocates between the annular walls which are spaced apart a distance equal to the unitary length times the positive or negative sine or cosine of the angular inclination relative to the unitary radiant 32.

If the vessel now changes course, say to a south-western direction, the directional cam 16 rotates in a clockwise or a counterclockwise direction such that the outer cylindrical surface 28 is positioned adjacent both feelers 38. Both of them now reciprocate in a direction towards the axis 18. For the feeler on radiant 48 and the corresponding register the distance in the southern direction continues to be added to the negative distance already recorded on it. This must be so since the vessel's position continues to be progressively further south. The other register, however, is now actuated in the opposite direction such that the new readings represent the distances it travelled along the east-west axis and are subtracted from the total on the register. This must also be since the vessel's absolute position now becomes further west than it was when it changed course from south-east to south-west.

Similar changes occur as the vessel's heading changes to north-east or north-west, for example. If at the commencement of the travel the registers were set to zero the absolute position of the vessel relative to that point of origin or null point can be ascertained by plotting the distances shown on the registers on a map. If the vessel travelled in a northern or in an eastern direction the additions are positive. If it travelled in a southern or western direction the additions to the total on the registers are negative. The register can, of course, be arranged so that the additions are positive when the vessel travels south or west and negative when it travels north or east.

Irrespective of the number of times the vessel changes its course its position relative to the point of origin can always be ascertained from the totals recorded on the registers. To facilitate the reading of the registers they are preferably of the type which have a double counter and a pair of windows (not shown), one of which is always closed. Each window indicates a particular direction. When it is closed the total travel of the vessel from the point of origin is in the other direction and is shown at the other, open window. For example, if the vessel travels north from the point of origin the southern window is closed and the northern window open. This automatically indicates to the navigator that he is north of his null point a distance equal to the total shown on the register.

When commencing a journey the navigator turns both registers to zero which indicates his point of origin and departure. That point is known to him and can be determined on a map. Thereafter the instrument continues to take one measurement every 1/50th of a mile of travel of the vessel. The registers record the vessel's travel in the coordinate directions of the compass. The instrument is left running during all times the vessel is in motion.

Figure 4:
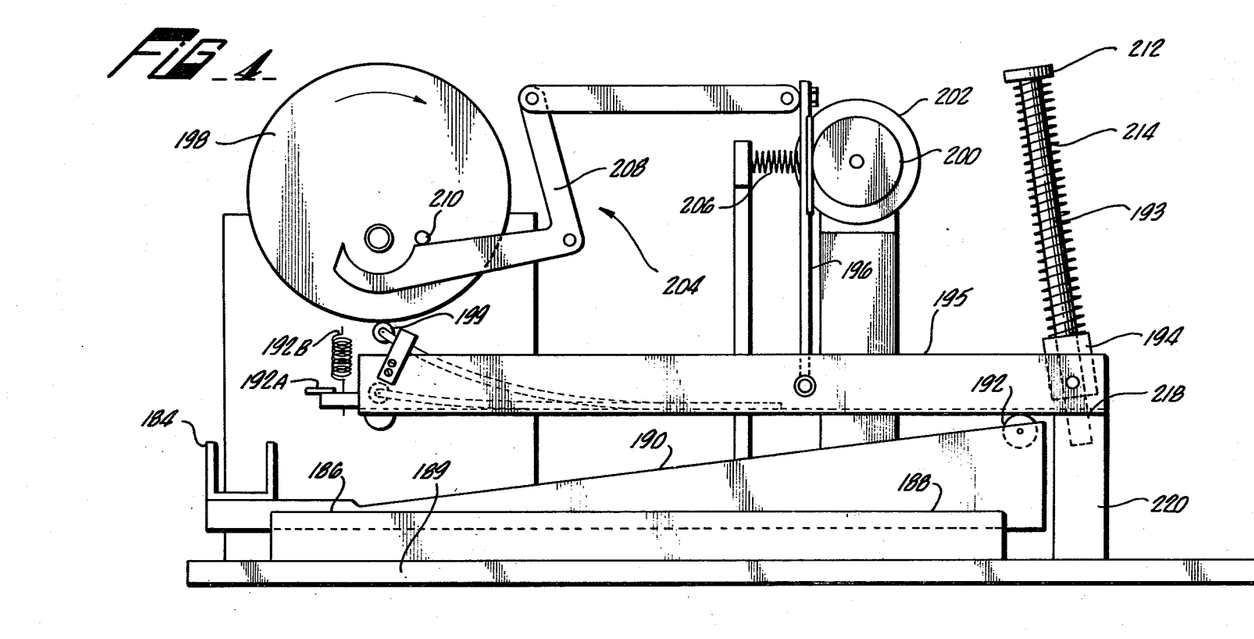
FIG. 4 is a front elevational view of another embodiment of this invention.
Figure 5:
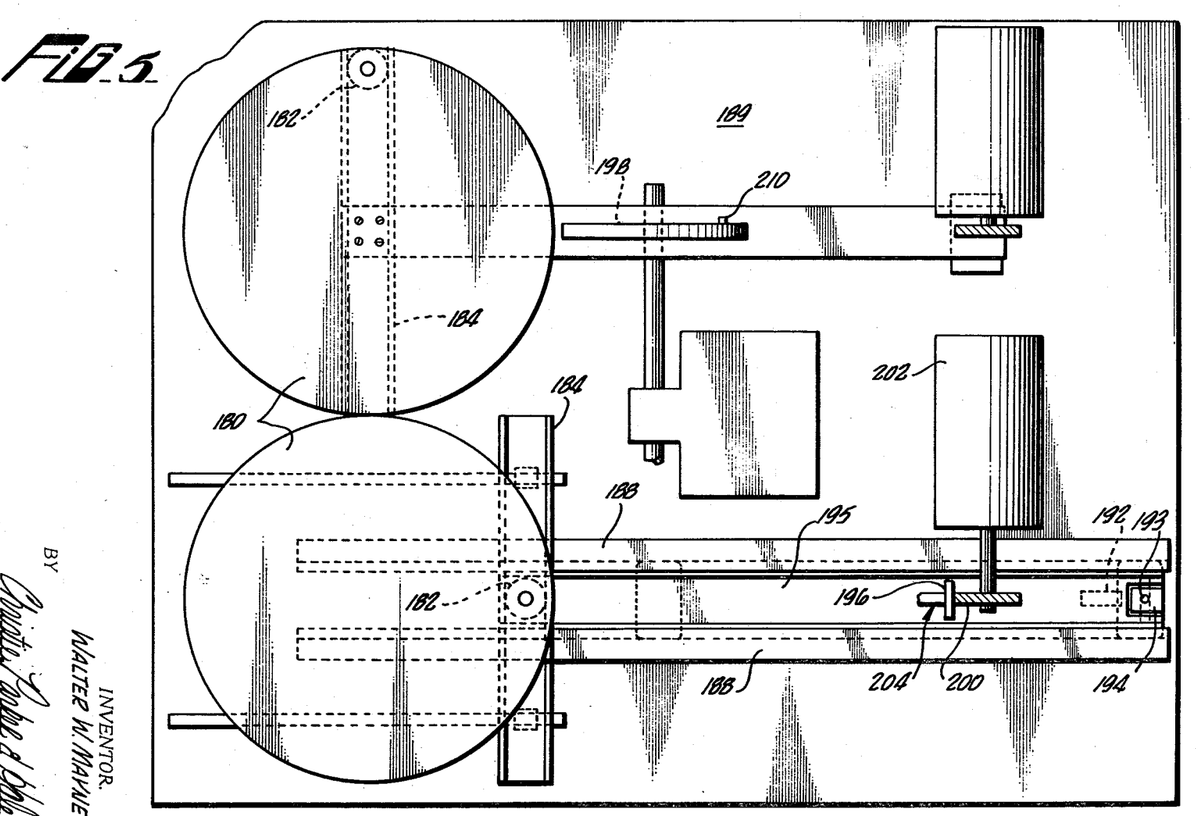
FIG. 5 is a plan view of the instrument shown in FIG. 4.

Another embodiment of this invention is shown in FIGS. 4 and 5. The dead reckoning instrument shown there includes a pair of axially spaced rotatable discs 180 which, adjacent their periphery include a roller 182 in engagement with a traverse rail 184. The traverse rail is secured to a sled 186 movable in a pair of laterally spaced tracks 188.

The upper side of the sled defines an angularly inclined surface 190 which slopes downwardly towards the traverse rail and which, adjacent its end opposite from the rail, includes a roller 192. The traverse rail together with the sled and the roller 192 are therefore movable in a direction towards and away from the center of the disc 180.

Referring to FIG. 4, an upright post 193 is secured to the base 189, has a slight angular inclination, and slidably mounts a sleeve 194 which is pivotally secured to an arm 195. The arm is supported by the roller 192 and a stop 192A suitably mounted adjacent the other end of the arm. A spring 192B biases the other end against the stop. The roller 192 and the stop are arranged such that the arms is in a horizontal position when in contact with both. A clapper 196 is pivotally secured to the arm. A rotatable cam 198 is mounted above an end of the arm adjacent the traverse rail 184, engages the arm, and depresses it against the force of springs 192B and 193 by pivoting it in a counterclockwise direction, as viewed in FIG. 4 about its contact point with wheel 192. To allow for overtravel the arm preferably includes a spring loaded roller 199 which engages the cam. The pivotal movement of the arm reciprocates the clapper in a substantially vertical direction past the periphery of a drive wheel 200 of an odometer or register 202.

A linkage 204 includes a coil spring 206 biasing the clapper into engagement with the drive wheel 200. It also includes a bell crank 208 which extends to adjacent the cam 198 and which is engaged by an eccentrically mounted pin 210 during a portion of the cam's revolution. When the pin engages the bell crank 208 the linkage moves the clapper in opposition to the force exerted by spring 206 and disengages it from the drive wheel.

Disposed about post 193 and in engagement with sleeve 194 and an upper end 212 of the post is a compression spring 214 which biases the sleeve in a downward direction. The underside of the arm 195 is thereby biased into engagement with a face 218 of a block 220 mounting the post 193 on the base 189.

The wheel 192 and the pivot point between the arm and the clapper 196 are spaced apart a distance equal to a distance between the center of disc 180 and the axis of roller 182. Rotation of the disc through 180° thereby positions roller 192 to the left-hand side of the pivot point a distance equal to the distance it is to the right when roller 182 is positioned as shown in FIG. 4.

The magnitude of the movement of the clapper 196 when the arm is pivoted by cam 198 is a function of the position of the roller 192 relative to the pivot point between the clapper and the arm 194. This position is a function of the position of roller 182 and disc 180 which in turn is controlled by a compass (not shown) and corresponds to the heading of the vehicle in which the instrument is installed. For example, assuming the odometer 202 shown in FIG. 4 indicates the north or south travel of the vehicle, the roller 192 is in the position closely adjacent to the upright post 193 when the vehicle travels due north. If the vehicle travels in either due east or west without any motion in either the south or the north direction, the disc has rotated 90° from the position shown in FIG. 5 and the roller 192 is vertically aligned with the pivot point between the clopper 196 and the arm 195. Pivotal movement of the arm results in no movement of the clapper and therefore in no recordation of any north or south travel. If the vehicle travels due south the center of roller 192 is disposed to the left (as seen in FIG. 4) of the clapper distance which equals the distance of the roller when it is furthest to the right of the clapper and the vehicle travels to the north. The instrument thereby records all north or south movements of the vehicle in which it is installed.

A second and similar clapper, odometer, arm, and cam are installed adjacent the other of the two discs to record east or west movements of the vessel. They operate in an identical manner and record east and west movements of the vessel. For brevity they are not further described herein.

The movements of the arm 195 and the clapper 196 may, of course, be induced by means other than a rotatable cam. For example, the cam and the linkage 204 may be replaced by conventional solenoids (not shown) which are energized by suitable microswitches (not shown) actuated by the discs 180.

A navigator ascertains the travelled distance from a point of origin in a manner identically to that described in conjunction with the preferred embodiment of this invention. The components of the travel in coordinate axis of the compass are then plotted on the map to find the vessel's position.

What is claimed is:
1. A dead reckoning instrument comprising:
   (a) a register having a drive wheel for recording travel of a vehicle in coordinate directions of a compass;
   (b) a pivotally mounted reciprocable member selectively engageable with the drive wheel;
   (c) means for engaging the member and the drive wheel when the member reciprocates in one direction and for disengaging the member and the wheel when the member reciprocates in another, opposite direction;

(d) means responsive to the direction of travel of the vehicle for limiting the reciprocating movement of the member to sine and cosine components of a unitary length in the coordinate directions; and (e) drive means for periodically reciprocating the member, the drive means being capable of moving the member in opposing directions.

2. Apparatus according to claim 1, wherein the register comprises an odometer and the member includes a friction surface in engagement with a periphery of the drive wheel.

3. Apparatus according to claim 1 wherein the limiting means include a pivotable beam pivotally secured to an end of the member, and linearly movable pivot means for defining a pivot point of the beam such that a length and the direction of the reciprocal movement of the member is a function of the position of the pivot means on the beam.

4. Apparatus according to claim 3 wherein the drive means include a rotatable cam for engaging and pivoting the beam and means for periodically rotating the cam through a full revolution.

5. Apparatus according to claim 3 wherein the pivot means include a roller mounted on a base linearly movable in a direction perpendicular to a pivot axis about which the member and the beam pivot, and including means for moving the support in response to changes in the direction of the vehicle's travel.

6. Apparatus according to claim 1 wherein the limiting means include a directional cam rotatable about a center and a race way defined by a pair of annular walls, the annular walls being arranged such that they are spaced apart a distance respectively corresponding to a sine and a cosine component on any pair of perpendicular radiants of a maximum distance between the walls.

7. Apparatus according to claim 6 wherein the member is movable along a radiant of the directional cam and the drive means include a cylindrical feeler disposed in the race way and connected with the member, the feeler having a diameter substantially equal to a smallest distance between the annular walls such that the annular walls prevent the feeler from moving in a radial direction when said smallest distance is radially aligned with the radiant along which the feeler moves.

8. Apparatus according to claim 7 wherein the drive means include a rotatable drive cam, and a linkage connected with the drive cam and the member, the drive means being capable of reciprocating the member a distance which is at least twice as great as the greatest possible travel of the cam follower between the walls in the direction of a radiant of the directional cam and the linkage being adapted to be subjected to a motion imparted by the drive cam without transmitting any motion to the member.

9. Apparatus according to claim 1 including braking means for preventing rotation of the drive wheel while it is disengaged from the member and wherein the engaging means are operatively connected with the braking means.

10. Apparatus according to claim 6 including means for preventing rotation of the directional cam while the drive means reciprocate the member.

11. Apparatus according to claim 7 wherein the member includes a friction strip engageable with a periphery of the drive wheel and constructed of a resilient material having a high coefficient of friction.

12. A dead reckoning instrument comprising:
(a) a directional cam rotatable about a center, defined by a race way having radially inner and outer walls, and a radial spacing between the walls such that a spacing of the walls on any pair of perpendicular radiants is the sine and the cosine function, respectively, of a maximum distance between the walls;
(b) a pair of feelers linearly movable along a pair of perpendicular radiants of the cam between the walls of the race way;
(c) a reciprocably mounted member connected with the feelers and linearly movable along said pair of perpendicular radiants;
(d) a register selectively engageable with the member; and
(e) means for reciprocating the feeler and the member.

13. Apparatus according to claim 12, wherein a portion of the inner wall extending over 180° and a portion of the outer wall diametrically opposite from said portion of the inner wall and also extending over 180° are defined by cylindrical surfaces coaxial with the center.

14. Apparatus according to claim 13 wherein the feeler is cylindrical, a smallest spacing between the inner and the outer wall is substantially equal to a diameter of the feeler, and said cylindrical surfaces have diameters which differ by the diameter of the feeler.

15. Apparatus according to claim 14 including a supporting frame, a carriage secured to the member and the feeler and pivotable relative to the member, the carriage being movable in a direction parallel to a radiant of the directional cam and secured to the feeler such that the feeler moves between the walls along a radiant of the directional cam, and means for biasing the member toward the periphery of a drive wheel of the register.

16. Apparatus according to claim 15 wherein the means for reciprocating the carriage include a drive cam, an arm connected with the carriage, and spring means between the arm and the drive cam for transmitting motions of the drive cam to the arm and the carriage.

17. Apparatus according to claim 16 including first brake means for preventing rotation of the drive wheel when the member is disengaged therefrom.

18. Apparatus according to claim 16 including second brake means for preventing rotation of the directional cam at least while movements of the feeler are being recorded by the register.

19. A dead reckoning instrument comprising:
(a) a compass generating an output signal corresponding to its heading;
(b) a directional cam rotatable about a center and having radially spaced annular side walls, the side walls being spaced apart such that their spacing on perpendicular radiants changes in accordance with the sine and the cosine function of a unitary length between the side walls;
(c) directional means responsive to the output signal for rotating the directional cam such that a fixed pair of perpendicular radiants are aligned with radiants on which the spacing between the walls represents respective components of the unitary length on coordinate axes of the compass;
(d) at least one reciprocable cylindrical feeler disposed between the side walls, having an axis parallel to an axis of directional cam and a diameter substantially equal to a smallest spacing between the walls;
(e) means for periodically reciprocating the feeler in alignment with one of said pair of fixed radiants;
(f) a register adjacent each feeler; and
(g) means connected with the feeler for actuating the register in response to movements of the feelers in a radial direction between the side walls.

20. Apparatus according to caim 19 wherein a portion of one side wall extending over 180° and a diametrically opposite portion of the other wall also extending over 180° are defined by coaxial cylindrical surfaces having the center of the directional cam as their axis and diameters which differ by about the diameter of the feeler.

21. Apparatus according to claim 20 wherein the actuating means for the register include an elongated bar pivotable about an axis disposed on and perpendicular to one of the fixed radiants and which is connected with the feeler, a drive wheel connected with the register, means for biasing the bar into engagement with the periphery of the drive wheel when the feeler moves in one direction, and means for biasing the bar away from the drive wheel when the feeler moves in the other, opposite direction.

References Cited

UNITED STATES PATENTS

| | | | |
|---|---|---|---|
| 1,953,894 | 4/1934 | Crouse | 235—61 |
| 2,507,567 | 5/1950 | Garnier | 235—61 |
| 3,010,329 | 11/1961 | Rumrill et al. | 74—198 |
| 3,205,346 | 9/1965 | Wright et al. | 235—61 XR |
| 3,265,872 | 8/1966 | Bayley | 235—150.271 |

STEPHEN J. TOMSKY, Primary Examiner

U.S. Cl. X.R.

73—178; 235—150.271